(12) United States Patent
Seekircher et al.

(10) Patent No.: US 10,180,945 B2
(45) Date of Patent: Jan. 15, 2019

(54) DATA REPLICATION FROM A CLOUD-BASED STORAGE RESOURCE

(71) Applicant: Adobe Inc., San Jose, CA (US)

(72) Inventors: Norbert Seekircher, Hamburg (DE); Frank Soetebeer, Amelinghausen (DE); Boris Pruessmann, Hamburg (DE)

(73) Assignee: Adobe Inc., San Jose, CA (US)

( * ) Notice: Subject to any disclaimer, the term of this patent is extended or adjusted under 35 U.S.C. 154(b) by 441 days.

(21) Appl. No.: 14/792,893

(22) Filed: Jul. 7, 2015

(65) Prior Publication Data

US 2016/0224609 A1 Aug. 4, 2016

Related U.S. Application Data

(60) Provisional application No. 62/110,807, filed on Feb. 2, 2015.

(51) Int. Cl.
| | |
|---|---|
| *G06F 7/00* | (2006.01) |
| *G06F 17/00* | (2006.01) |
| *G06F 17/30* | (2006.01) |
| *G06F 15/16* | (2006.01) |

(52) U.S. Cl.
CPC .. *G06F 17/30174* (2013.01); *G06F 17/30215* (2013.01)

(58) Field of Classification Search
CPC .............. G06F 17/30174; G06F 17/30215
USPC .................................................. 707/620
See application file for complete search history.

(56) References Cited

U.S. PATENT DOCUMENTS

| | | | | |
|---|---|---|---|---|
| 6,195,761 | B1* | 2/2001 | Kedem | G06F 11/1076 711/114 |
| 6,925,476 | B1* | 8/2005 | Multer | G06F 17/30174 707/999.202 |
| 8,538,973 | B1* | 9/2013 | Gonzalez | G06F 17/3087 707/758 |
| 8,799,322 | B2 | 8/2014 | deMilo et al. | |
| 8,799,413 | B2 | 8/2014 | Taylor et al. | |
| 9,329,789 | B1* | 5/2016 | Chu | G06F 3/064 |
| 2011/0196829 | A1* | 8/2011 | Vickrey | G06F 17/30581 707/622 |
| 2013/0198477 | A1* | 8/2013 | Wilkinson | G06F 17/30 711/167 |
| 2013/0226876 | A1 | 8/2013 | Gati et al. | |

(Continued)

Primary Examiner — Usmaan Saeed
Assistant Examiner — Brian E. Weinrich
(74) Attorney, Agent, or Firm — Finch & Maloney PLLC

(57) ABSTRACT

A local computing device replicates data stored in a cloud-based storage resource in a way that is substantially transparent to end users. A counter generation module provides a source for sequentially increasing counter indices, each of which is associated with a creation timestamp. When a data record managed by the cloud-based storage resource is created, updated or deleted, an address of the modified data record is recorded in a journal, along with unique counter index and timestamp values. Later, when data records stored in the cloud-based storage resource are to be replicated at the local computing device, data records corresponding to the sequential counter indices listed in the journal are sent to the local computing device. Only those data records which correspond to blocks of uninterrupted sequential counter indices are transmitted to the local computing device, thereby ensuring consistency of the replicated data.

20 Claims, 7 Drawing Sheets

(56) References Cited

U.S. PATENT DOCUMENTS

2014/0040197 A1 2/2014 Wijayaratne et al.
2015/0242339 A1* 8/2015 Coronado ............... G06F 3/065
  711/145

* cited by examiner

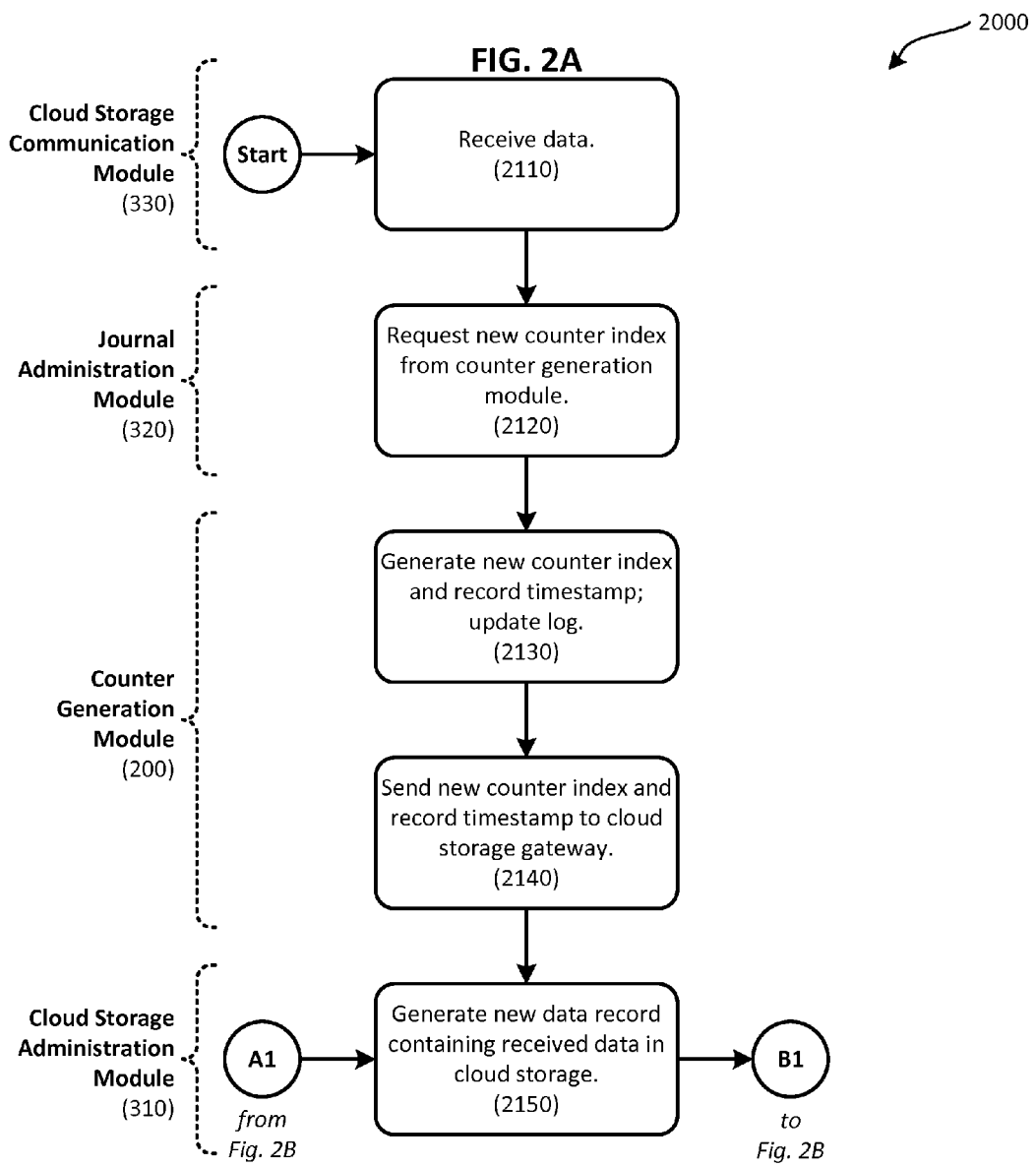

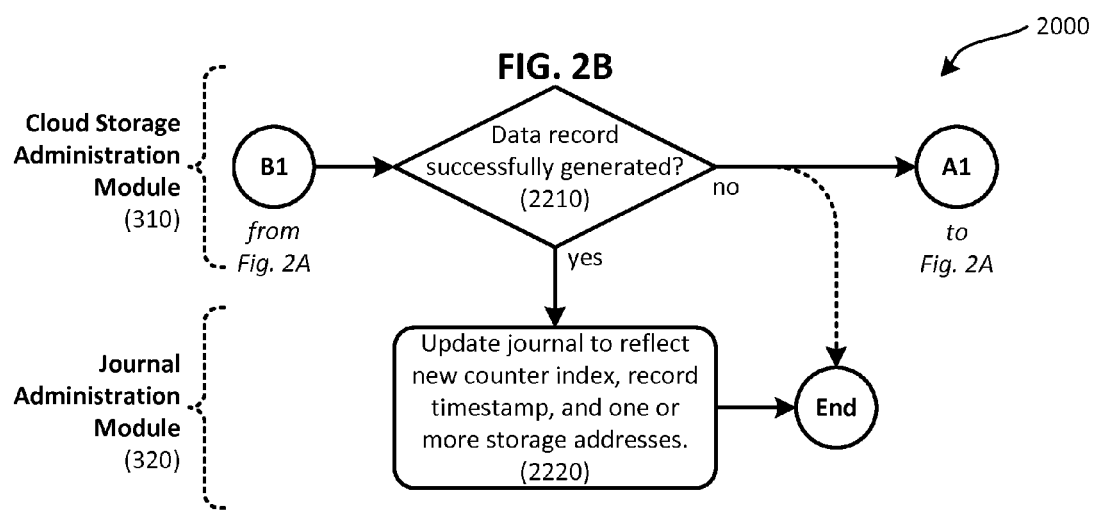

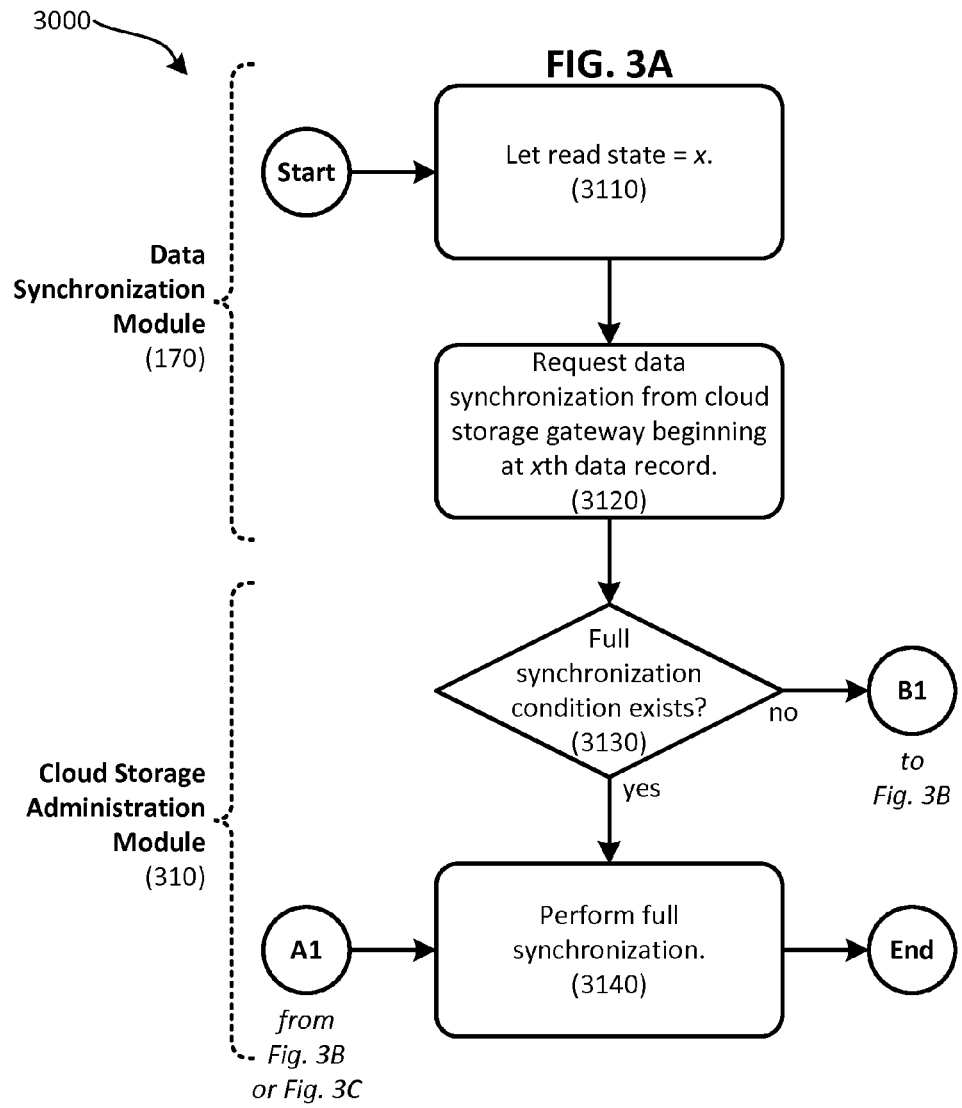

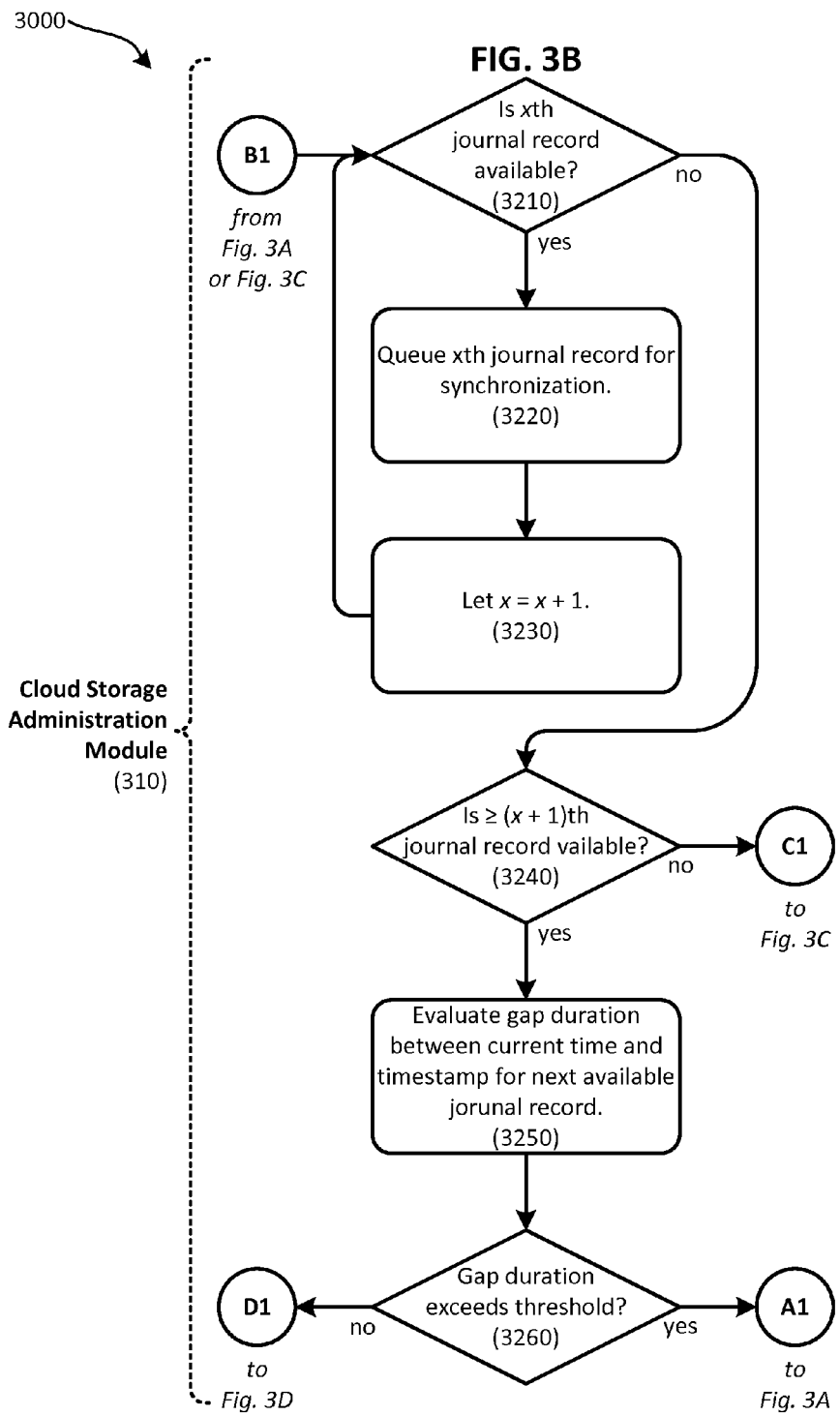

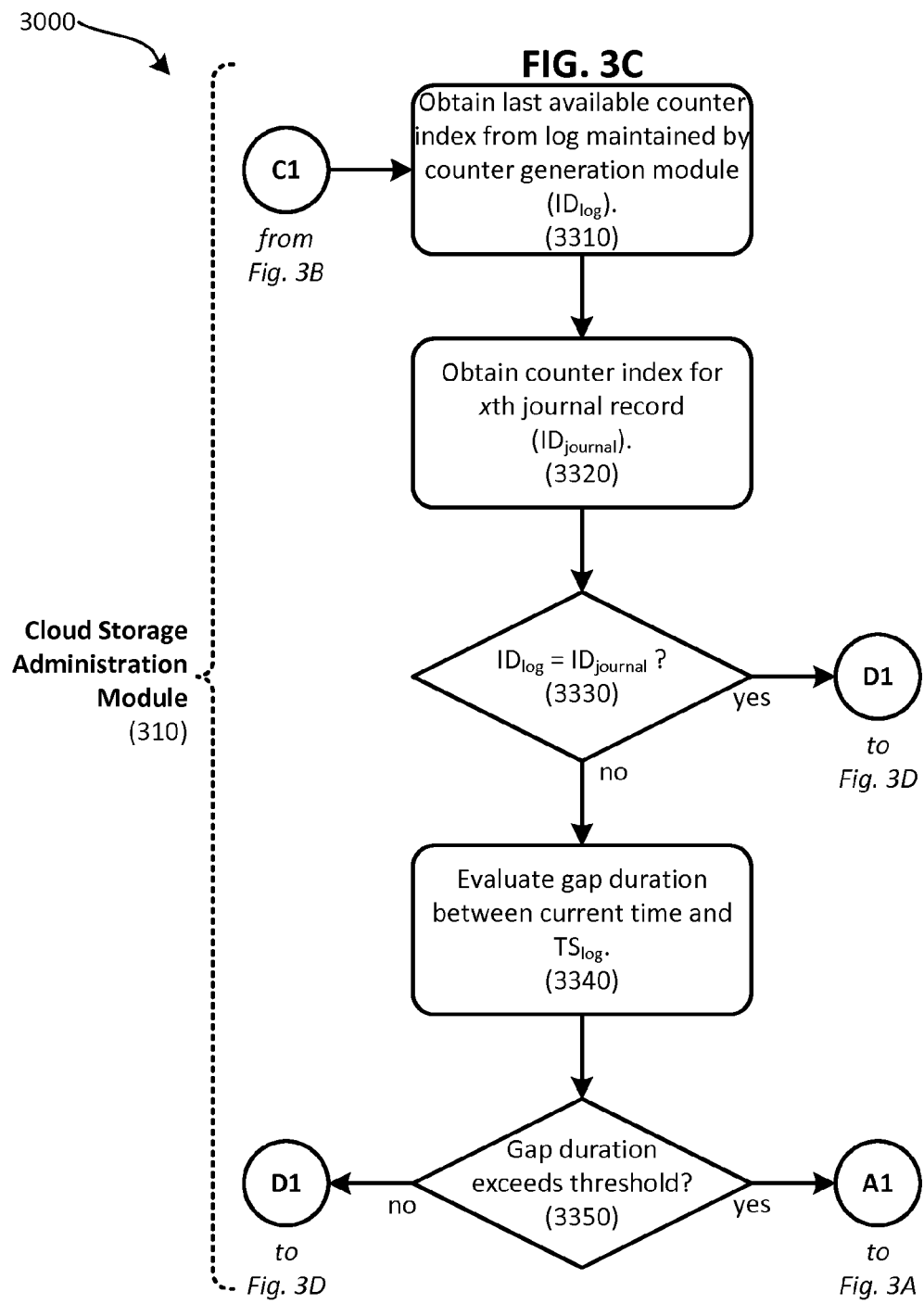

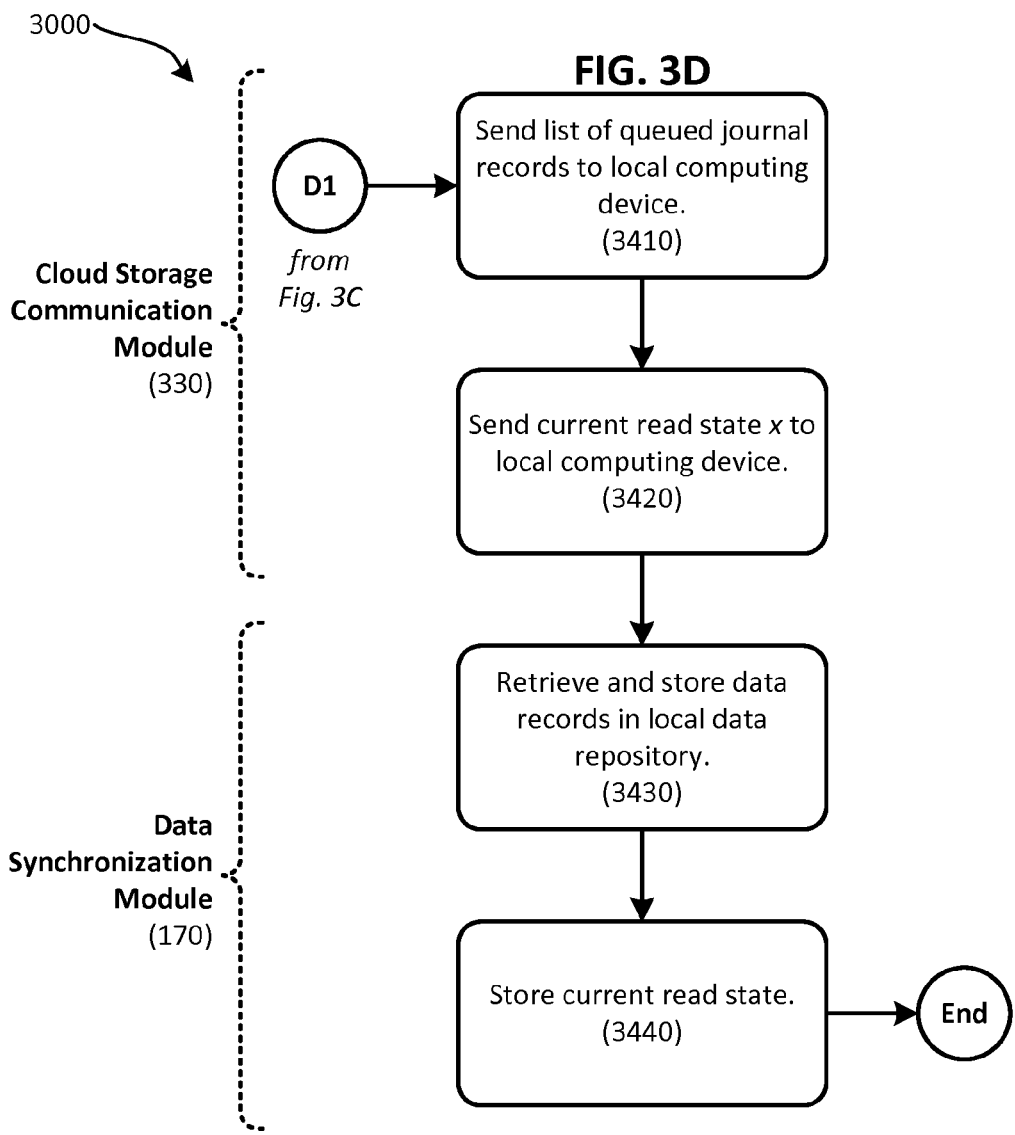

DATA REPLICATION FROM A CLOUD-BASED STORAGE RESOURCE

REFERENCE TO PRIOR APPLICATION

This application claims the benefit of U.S. Provisional Patent Application 62/110,807 (filed 2 Feb. 2015). The entire disclosure of this priority application is hereby incorporated by reference herein.

FIELD OF THE INVENTION

This application relates generally to data management systems, and more specifically to methods that enable a local computing device to replicate data stored in a cloud-based storage resource.

BACKGROUND

As digital computing systems become increasingly ubiquitous, the data storage demands associated with such systems continue to grow geometrically. One way of addressing this ever-expanding storage demand is through the use of cloud-based storage resources. In general, a cloud-based storage resource can be understood as providing data storage in a distributed network of storage devices rather than on one specific device. Storing data in a cloud-based storage resource, which is often colloquially referred to as storing data "in the cloud", enables the stored data to be accessed via nearly any device capable of connecting to the resource. Cloud-based storage resources therefore provide users with a convenient and scalable storage solution that eliminates the need to procure and maintain dedicated physical storage hardware. Storing data in the cloud also provides a convenient way to share data amongst multiple users, thus facilitating workgroup collaboration. Cloud-based storage resources are also often used to replicate storage provided at a local computing device, for example to provide a backup copy of a local file system. Maintaining synchronization of local and cloud-based file systems is particularly important in data replication applications because the benefit of a data replication scheme decreases as the number of discrepancies between the local and cloud-based file systems increases. As a result, a number of data synchronization schemes have been developed to address the challenge of minimizing such discrepancies.

BRIEF DESCRIPTION OF THE DRAWINGS

FIGS. 2A and 2B comprise a flowchart illustrating an example data storage method that maintains a sequential counter log having a counter index and a timestamp for each of a plurality of users. The entries in the counter log correspond to journal records that, in turn, correspond to updates to data records that are stored in a cloud-based storage resource that is managed by a cloud storage gateway.

FIGS. 3A through 3D comprise a flowchart illustrating an example data replication method that allows a local computing device to replicate data stored in a cloud-based storage resource that is managed by a cloud storage gateway.

DETAILED DESCRIPTION

Figure 1:
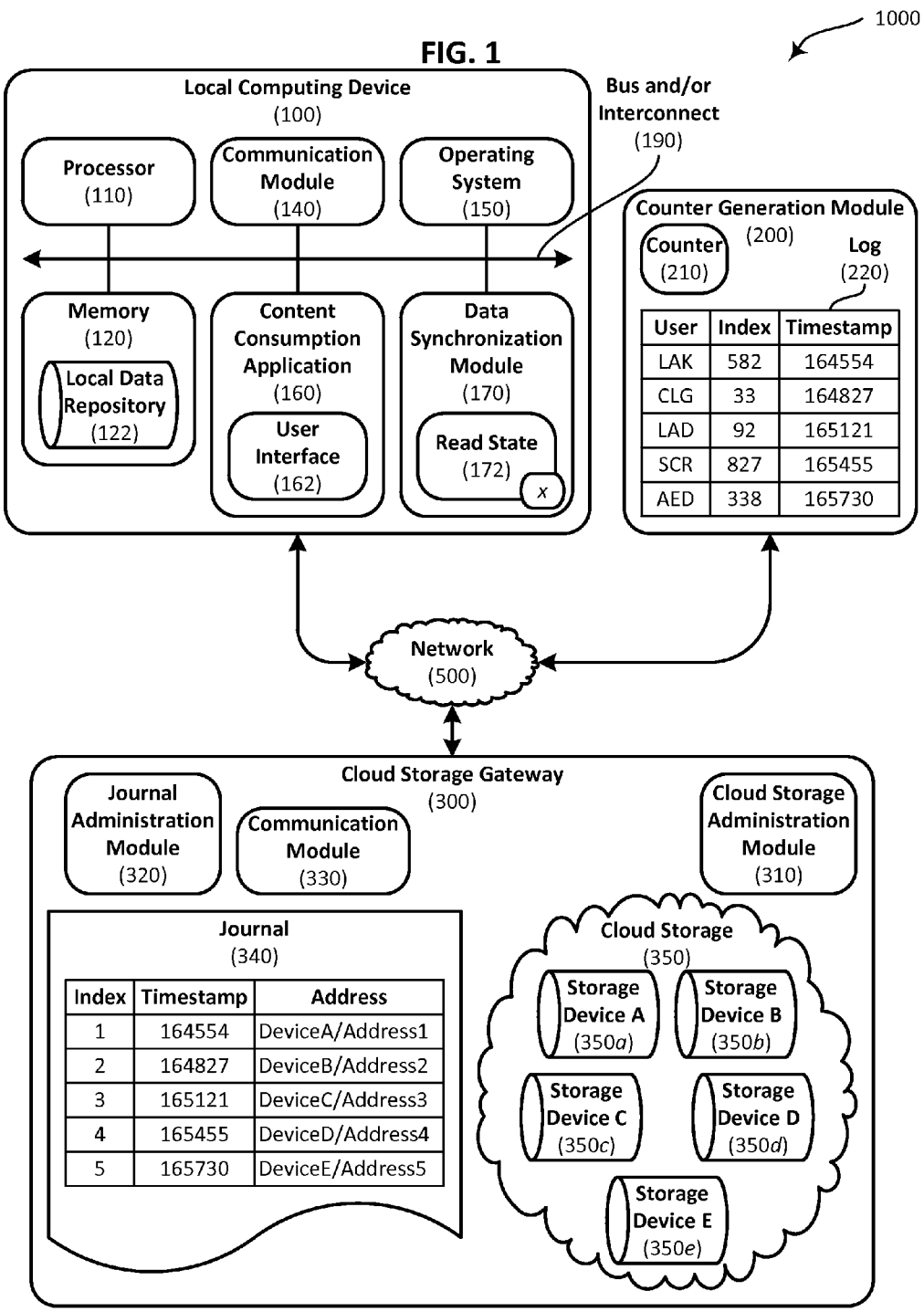
FIG. 1 is a block diagram schematically illustrating selected components of an example embodiment of a data replication system that enables a local computing device to replicate data stored in a cloud-based storage resource that is managed by a cloud storage gateway.

The easily accessible and scalable nature of cloud-based storage resources provides an attractive solution for data backup, retention, and replication applications. For example, a user may wish to synchronize local and cloud file systems such that changes made to a file locally are automatically reflected in the cloud-based version of that same file, and vice-versa. This not only provides redundancy in the event the local file system fails or is otherwise compromised, but it also ensures that the local file system reflects changes made in the cloud-based storage resource. This is particularly useful in collaboration applications, where a local user may be unaware of changes made to digital assets stored in the cloud. Ideally, data replication is maintained continually, thus reducing the number of discrepancies that exist between the local and cloud file systems. A robust data replication system should also continue to operate at the same time end users are accessing and manipulating the stored data, and therefore should not be adversely affected by data that is temporarily unavailable at a given time. Furthermore, from an end user's perspective, a data replication system should operate transparently and should not consume significant processing resources. Given these user expectations, the burden involved in maintaining accurate synchronization between local and cloud file systems can be significant. Providing a system that meets these performance criteria and user expectations represents a substantial challenge in the field of cloud-based data management.

Thus, and in accordance with certain of the embodiments disclosed herein, improved data management techniques enable a local computing device to robustly replicate data stored in a cloud-based storage resource in a way that is substantially transparent to end users. In one implementation a counter generation module provides a source for sequentially increasing counter indices, each of which is associated with a creation timestamp. When a data record stored in the cloud-based storage resource is created, updated, or deleted, an address of the updated data record is recorded in a corresponding journal record, along with unique counter index and timestamp values. Later, when data records stored in the cloud-based storage resource are to be replicated at the local computing device, for example in response to a threshold number of data manipulation operations having occurred, or a predetermined time period having elapsed, data records corresponding to sequential counter indices listed in the journal are sent to the local computing device. Only those data records which correspond to blocks of uninterrupted sequential counter indices are transmitted to the local computing device, thereby ensuring consistency of the replicated data. Where the sequence of counter indices is interrupted or broken, and where such interruption persists beyond a threshold time limit, it is assumed that an inconsistency exists in the journal, for example as may be caused by a failed data write operation or a failed storage device in the cloud-based storage resource. In such case a full synchronization can be performed between the local computing device and the cloud-based storage resource. Numerous configurations and modifications will be apparent in light of this disclosure.

Certain of the embodiments disclosed herein provide a system that is able to robustly and accurately replicate a cloud-based file system at a local computing device in a way that is substantially transparent to end users, and that does not consume significant processing resources. The sequential indices procured by counter generation module form the basis of the aforementioned journal. Gaps in the indices recorded in the journal, and inconsistencies between the indices generated by the counter and the indices recorded in the journal are indicative of data records which are unavailable. Such data records may be unavailable because of other concurrent data manipulation operations, because of a hardware failure in the cloud-based storage resource, or because of a problem in the counter generation module. Regardless of the cause, the various data replication methods disclosed herein provide a robust way of detecting such gaps and inconsistencies, and therefore allow alternative procedures for replicating data corresponding to such gaps and inconsistencies to be invoked. Yet another advantage associated with certain of the techniques disclosed herein is that such techniques reduce the extent to which read state information is persisted at a local computing device. In particular, only a single read state index representing the next data record to be replicated is stored at the local computing device, thus reducing the extent to which local computing resources are dedicated to data replication. These and other advantages will be apparent in view of the foregoing detailed description.

As used herein, the term "cloud-based storage resource" refers, in addition to its ordinary meaning, to a computing resource that provides data storage in a distributed network of storage devices rather than one specific device. However, notwithstanding the fact that it comprises a large number of distributed resources, a cloud-based storage resource acts as—and therefore can be interacted with as—a single storage device. The data stored in a cloud-based storage resource can be logically organized into a plurality of "data records" which may, for example, correspond to individual files, objects, or other logical containers. Cloud-based storage resources are typically owned and administered by a host that is responsible for keeping data available and accessible, although larger organizational users may build and administer their own cloud-based storage resources. Regardless of the particular administrative model implemented, users access the services provided by a cloud-based storage resource via an application programming interface (API) or via applications that use the API, such as a cloud storage desktop application, a cloud service gateway, or a web-based content management system. In many cases the same host that manages the cloud-based storage resource also provides the API or user interface through which the resource can be leveraged. Cloud-based storage resources are therefore often understood as being implemented in a client-server computing environment, wherein the cloud-based storage resource functions as a server, and the local computing device acts as a client. Commercially available cloud-based storage resources include Google Drive (Google Inc., Mountain View, Calif.), iCloud (Apple Inc., Cupertino, Calif.), and OneDrive (Microsoft Corporation, Redmond, Wash.).

As used herein, the term "data structure" refers, in addition to its ordinary meaning, to a way of storing and organizing data in a computer accessible memory so the data can be used by an application or software module. In its simplest form, a data structure can be, for example, a set of one or more memory locations. In some cases a data structure may be implemented as a so-called record, sometimes referred to as a struct or tuple, and may have any appropriate number of fields, elements, or storage locations. As will be further appreciated, a data structure may include data of interest or a pointer that refers to a memory location where the data of interest can be found. A data structure may have any appropriate format such as, for example, a lookup table or index format; an array format; a hash table format; a graph, tree, or hierarchical format having a number of nodes; an object format that includes data fields; or a combination of the foregoing. A data structure may include executable code for accessing and modifying the underlying structure and format of the data stored therein. In a more general sense, the data structure may be implemented as a data set that can store specific values without being constrained to any particular order or format. In one embodiment, a data structure comprises a table correlating a particular counter index, timestamp, and network address in a cloud-based storage resource. Numerous other data structure formats and applications will be apparent in light of this disclosure.

System Architecture

FIG. 1 is a block diagram schematically illustrating selected components of an example embodiment of a data replication system 1000 that enables a local computing device 100 to replicate data stored in a cloud-based storage resource that is managed by, for example, a cloud storage gateway 300. In such embodiments local computing device 100 and cloud storage gateway 300 communicate with each other via a network 500. Cloud storage gateway 300 is also configured to communicate with a counter generation module 200 via network 500. Other embodiments may have fewer or more communication paths, networks, subcomponents, and/or resources depending on the granularity of a particular implementation. For example, in an alternative embodiment counter generation module 200 is integrated into and provided by cloud storage gateway 300. Likewise, while one local computing device and one cloud storage gateway are illustrated in FIG. 1 for clarity, it will be appreciated that, in general, tens, hundreds, thousands, or more cloud storage gateways can be configured to service the storage needs of an even larger number of local computing devices. Thus the embodiments described and illustrated herein are not intended to be limited to the provision or exclusion of any particular services and/or resources.

Local computing device 100 may comprise, for example, one or more devices selected from a desktop computer, a laptop computer, a workstation, an enterprise-class server computer, a handheld computer, a tablet computer, a cellular telephone, a smartphone, a set-top box, or any other suitable computing device. A combination of different devices may be used in certain embodiments. Local computing device 100 includes one or more software modules configured to implement certain of the functionalities disclosed herein, as well as hardware capable of enabling such implementation. The hardware may include, but is not limited to, a processor 110, a memory 120, and a communication module 140. A bus and/or interconnect 190 is also provided to allow for inter- and intra-device communications using, for example, communication module 140. The hardware may also include integrated or peripheral input/output components such as one or more of a tactile keyboard, a display, a touch sensitive display, a microphone, a camera, and any other suitable components that enable a user to control the operation of local computing device 100. The implementing software, on the other hand, may include components such as an operating system 150, a content consumption application 160, and a data synchronization module 170. Other componentry and functionality not reflected in the schematic block diagram of FIG. 1 will be apparent in light of this disclosure, and it will be appreciated that the present disclosure is not intended to be limited to any particular configuration of hardware and software.

A single user may connect to cloud storage gateway 300 using a variety of different local computing devices, for example, using a home computer, a work computer, and a smartphone. In this case, cloud storage gateway 300 can be configured to replicate the user's data at each of his/her devices. Likewise, a single local computing device can be used by multiple users to connect to cloud storage gateway 300. Thus in certain embodiments local computing device 100 is capable of partitioning a resource, such as memory 120, such that it can be shared by separate users. A user's replicated files can then be stored on his/her designed memory partition. Regardless whether local computing device 100 is used by one or several users, it can be coupled to network 500 to allow for communications with other computing devices and resources, such as counter generation module 200 and/or cloud storage gateway 300.

Referring to the hardware components that comprise the example local computing device 100 illustrated in FIG. 1, processor 110 can be any suitable processor, and may include one or more coprocessors or controllers, such as an audio processor or a graphics processing unit, to assist in processing operations of local computing device 100. Memory 120 can be implemented using any suitable type of digital storage, such as one or more of a disk drive, a universal serial bus drive, flash memory, and/or random access memory. In one embodiment memory 120 includes a local data repository 122, such as a local file system, into which replicated data is stored. Communication module 140 can be any appropriate network chip or chipset which allows for wired and/or wireless communication via network 500 to one or more of the other components described herein.

In terms of the software components that comprise local computing device 100, operating system 150 may comprise any suitable operating system, such as Google Android (Google Inc., Mountain View, Calif.), Microsoft Windows (Microsoft Corporation, Redmond, Wash.), or Apple OS X (Apple Inc., Cupertino, Calif.). As will be appreciated in light of this disclosure, the techniques disclosed herein can be implemented without regard to the particular operating system provided in conjunction with local computing device 100, and therefore may also be implemented using any suitable existing or subsequently developed platform. The implementing software may also include content consumption application 160, which can be configured to provide a user interface 162 that facilitates interaction with content, such as the data stored in local data repository 122, or the remotely-stored data managed by cloud storage gateway 300. For example, in certain embodiments content consumption application 160 includes one or more of a web browser, a word processor, a database interface, a digital image editing application, a multimedia player, and a document management system. Local computing device 100 may be configured to implement a wide range of other content consumption functionality in other embodiments, including content consumption functionality which is remotely provisioned via network 500.

Still referring to the example embodiment illustrated in FIG. 1, local computing device 100 further includes data synchronization module 170. In one implementation, data synchronization module 170 is configured to send a request to cloud storage gateway 300 for data synchronization according to a predetermined schedule, for example, once every five minutes, once every fifteen minutes, once every thirty minutes, or once every hour. Other synchronization intervals can be used in other implementations. In an alternative embodiment, data synchronization module 170 is configured to request data synchronization in response to a command received from a user of local computing device 100. Regardless of how synchronization is triggered, data synchronization module 170 is configured to store and report to cloud storage gateway 300 a read state 172 that indicates an index of a first data record that is to be requested upon data synchronization. Read state 172 can thus be understood as a cursor position from which available data records are read. In implementations wherein cloud storage gateway 300 triggers data synchronization, data synchronization module 170 can be configured to respond to a request from cloud storage gateway 300 by transmitting read state 172. Either way, read state 172 enables cloud storage gateway 300 to obtain the relevant information from the journal, thereby commencing the data synchronization process. Data synchronization module 170 is also optionally configured to receive replicated data from cloud storage gateway 300 and store such data in local data repository 122. If an unavailable data record is encountered, the counter index associated with such record can be stored as read state 172 which will serve as the starting point for a future data replication operation, as will be described in turn. In the example embodiment that is schematically illustrated in FIG. 1, read state 172 is represented by the index value x. In applications where data synchronization involves replicating data that is stored in a cloud-based storage resource to local computing device 100, the terms "data replication" and "data synchronization" can be used interchangeably.

Counter generation module 200 is configured to provide a source for sequentially increasing counter indices, each of which is associated with a creation timestamp. To this end, counter generation module 200 includes a counter 210 capable of generating the sequential indices, and a log 220 that comprises a data structure configured to store the indices and the corresponding timestamps for a plurality of users. Counter generation module 200 can be configured to generate new counter indices in response to a request from cloud storage gateway 300, for example as a result of cloud storage gateway receiving instructions to store a new data record. In certain embodiments counter generation module 200 is configured to maintain separate counter indices and timestamps for separate users thus enabling cloud storage gateway 300 to maintain separate journals for separate users. In such embodiments log 220 is associated with a token or other metadata that identifies a particular user. Counter generation module 200 is in communication with cloud storage gateway 300 via network 500. In an alternative embodiment, the functionality associated with counter generation module 200 is integrated into cloud storage gateway 300.

Referring still to the example data replication system 1000 illustrated in FIG. 1, certain implementations of cloud storage gateway 300 include one or more software modules configured to implement certain of the functionalities disclosed herein, as well as hardware capable of enabling such implementation. Examples of such implementing software include a cloud storage administration module 310, a journal administration module 320, and a journal 340, while examples of such enabling hardware include a communication module 330 and a plurality of storage devices that comprise cloud storage 350.

Cloud storage administration module 310 is configured to manage interactions with cloud storage 350, including determining whether a full synchronization condition exists, generating new data records to be stored in cloud storage 350, and reading existing data records from cloud storage 350. Cloud storage administration module 310 also includes logic for detecting gaps in a sequence of indexed data records stored in cloud storage 350, as well as for evaluating the aging of detected gaps. Such determinations enable cloud data replication system 1000 to determine when it would be appropriate to perform a full synchronization, for example due to failure of a storage device or failure of a data write operation.

Journal administration module 320 is configured to manage journal 340. For example, in certain embodiments journal administration module 320 requests new counter indices from counter generation module 200 and updates journal 340 to include the new counter indices once data records are successfully stored in cloud storage 350. Thus in such embodiments journal 340 comprises a data structure, also referred to herein as a "journal record", that includes not only the received index and timestamp, but also a network address identifying the location where the indexed data record was stored in cloud storage 350. As a result, each data record stored in cloud storage 350 is uniquely addressable based on (a) the sequential counter index that is received from counter generation module 200 and listed in journal 340, and optionally further based on (b) a user token. A given data record can therefore be addressed by network address information extracted from journal 340. Journal 340 thus provides an ordered listing for the data that a particular user has stored in cloud storage 350. And when read from read state 172 stored by data synchronization module 170, journal 340 provides a list of updates that should be sent to local computing device 100 to maintain synchronization of the local and cloud file systems. This allows the data records stored in cloud storage 350 to be retrieved and replicated in an ordered and consistent fashion.

A journal record can be understood as being immutable in the sense that once created, it memorializes a particular data record update. More specifically, updating a data record in cloud storage 350, either by modifying its content or adding a new version, will result in a new journal record corresponding to that update. Thus, when a data record is updated several times, several journal records corresponding to these updates will be generated. Data synchronization module 170 at local computing device 100 interprets these journal records to synchronize the updates, as disclosed herein. Even where a user wishes to replicate the stored data on multiple local computing devices, for example on a home computer, a work computer, and a smartphone, the same journal 340 can be used as a basis for extracting the correct data for replication. The sequential indices stored in journal 340 ensure that each data record update identified in the journal records is read once during a data replication operation for a given user. Where cloud storage 350 includes data associated with multiple users, as will usually be the case, journal administration module 320 can be configured to manage a separate journal for each of such multiple users. This is because, in principle, each user will wish to replicate a different collection of data from cloud storage 350. In this multiuser scenario, several different local computing devices, each of which is used by a different user, may replicate the same shared data record.

Since a particular user may wish to replicate both private data records and shared data records, read state 172 optionally comprises multiple read state indices, each of which corresponds to a particular journal. One journal may be configured to record manipulations that affect the particular user's private data. Each of one or more additional journals may be configured to record manipulations that affect shared data that the particular user is authorized to access. In particular, when a resource is initially configured as a shared resource, a separate journal which can be read by all collaborating users is established. Thus local computing device 100 will often read several journals to determine which data records should be replicated.

With respect to the hardware that enables the foregoing functionality, communication module 330 can be any appropriate network chip or chipset which allows for wired and/or wireless communication via network 500 to one or more of the other components described herein. Cloud storage 350 comprises the hardware that is used to store the data managed by cloud storage gateway 300. In one specific implementation, cloud storage 350 comprises a plurality of geographically distributed storage devices 350a, 350b, 350c, 350d, 350e that use any suitable technology for storing large quantities of digital data. Examples of such technologies include file servers that use semiconductor storage technology (such as dynamic random access memory or flash memory), magnetic hard disc storage technology, and/or optical disc storage technology. As will be appreciated in light of this disclosure, the techniques disclosed herein can be implemented without regard to the particular storage technology used to implement cloud storage 350, and therefore may also be implemented using any suitable existing or subsequently developed storage technology. Likewise, while only five storage devices are illustrated in FIG. 1, in general cloud storage 350 will often comprise tens, hundreds, thousands, or more storage devices. Many cloud-based storage resources introduce a degree of redundancy into the data storage scheme, and thus a given data record may be stored on a plurality of the storage devices.

The embodiments disclosed herein can be implemented in various forms of hardware, software, firmware, or special purpose processors. For example, in one embodiment a non-transitory computer readable medium has instructions encoded thereon that, when executed by one or more processors, cause one or more of the data storage and replication methodologies disclosed herein to be implemented. The instructions can be encoded using one or more suitable programming languages, such as C, C++, object-oriented C, JavaScript, Visual Basic .NET, BASIC, or alternatively, using custom or proprietary instruction sets. Such instructions can be provided in the form of one or more computer software applications or applets that are tangibly embodied on a memory device, and that can be executed by a computer having any suitable architecture. In one embodiment the system can be hosted on a given website and implemented using JavaScript or another suitable browser-based technology.

The functionalities disclosed herein can optionally be incorporated into a variety of different software applications, such as file management systems, document management systems, cloud storage desktop applications, and operating systems. For example, a document management system can be configured to automatically replicate a user's cloud-based library of documents in a local file system, thereby providing the user with full access to his/her library when disconnected from the document management system. The computer software applications disclosed herein may include a number of different modules, sub-modules, or other components of distinct functionality, and can provide information to, or receive information from, still other components and services. These modules can be used, for example, to communicate with peripheral hardware components, integrated hardware components, networked storage resources, or other external components and/or resources. More generally, other components and functionality not reflected in the illustrations will be apparent in light of this disclosure, and it will be appreciated that the present disclosure is not intended to be limited to any particular hardware or software configuration. Thus in other embodiments the components illustrated in FIG. 1 may comprise additional, fewer, or alternative subcomponents.

The aforementioned non-transitory computer readable medium may be any suitable medium for storing digital information, such as a hard drive, a server, a flash memory, or random access memory. In alternative embodiments, the computer and modules disclosed herein can be implemented with hardware, including gate level logic such as a field-programmable gate array, or alternatively, a purpose-built semiconductor such as an application-specific integrated circuit. Still other embodiments may be implemented with a microcontroller having a number of input and output ports for receiving and transmitting data, respectively, and a number of embedded routines for carrying out the various functionalities disclosed herein. It will be apparent that any suitable combination of hardware, software, and firmware can be used, and that the present disclosure is not intended to be limited to any particular system architecture. As used in this disclosure, the term "non-transitory" excludes transitory forms of signal transmission.

Methodology

FIGS. 2A and 2B comprise a flowchart illustrating an example data storage method 2000 that maintains sequential counter log 220 having a counter index and a timestamp for each of a plurality of users. The entries in the counter log correspond to journal records that, in turn, correspond to updates to data records that are stored in a cloud-based storage resource that is managed by cloud storage gateway 300. FIGS. 3A through 3D comprise a flowchart illustrating an example data replication method 3000 that allows local computing device 100 to replicate data stored in a cloud-based storage resource that is managed by, for example, cloud storage gateway 300. As can be seen, data storage method 2000 and data replication method 3000 each include a number of phases and sub-processes, the sequence of which may vary from one embodiment to another. However, when considered in the aggregate, these phases and sub-processes form a complete data management process that is responsive to user commands and/or detected conditions in accordance with certain of the embodiments disclosed herein. These methodologies can be implemented, for example, using the system architecture illustrated in FIG. 1. However other system architectures can be used in other embodiments, as will be apparent in light of this disclosure. To this end, the correlation of the various functionalities shown in FIGS. 2A and 2B, as well as in FIGS. 3A through 3D, is not intended to imply any structural and/or use limitations. Rather, other embodiments may include varying degrees of integration where multiple functionalities are performed by one system or by separate systems. For instance, in an alternative embodiment the functionality associated with counter generation module 200 can be integrated into cloud storage gateway 300. Thus other embodiments may have fewer or more modules and/or sub-modules depending on the granularity of implementation. Numerous variations and alternative configurations will be apparent in light of this disclosure.

In one implementation, example data storage method 2000 commences with the cloud storage communication module 330 receiving data. See reference numeral 2110 in FIG. 2A. In many cases communication module 330 will receive the data from local computing device 100, although in some cases the data may be received from a different component on behalf of a user of local computing device 100. For example, an email server can be configured to forward data that is received at a particular email address to cloud storage gateway 300 with reference to a particular user's cloud storage account. Regardless of how it is received, journal administration module 320 is configured to request a new counter index from counter generation module 200 upon receipt of the data. See reference numeral 2120 in FIG. 2A. In certain implementations the request sent to counter generation module 200 includes a token or other metadata identifying the user associated with the received data, thereby enabling counter generation module 200 to create a counter index that is sequential to previously generated counter indices for that particular user. In response to the request, counter generation module 200 generates a new counter index and record timestamp, and updates log 220 accordingly. See reference numeral 2130 in FIG. 2A. The record timestamp corresponds to the time at which the new counter index was generated. Log 220 is updated to reflect the new counter index, the corresponding record timestamp, and a user identification associated with these new parameters. In particular, in implementations where cloud storage gateway 300 manages data associated with multiple users, counter generation module 200 can be configured to maintain separate log entries for separate users. In one implementation the new parameters and generated and log 220 is updated atomically to ensure that the new counter value is unique. The new counter index and corresponding record timestamp are sent to cloud storage gateway 300. See reference numeral 2140 in FIG. 2A.

Cloud storage administration module 310 generates a new data record containing the received data in cloud storage 350. See reference numeral 2150 in FIG. 2A. In some implementations the new data record can be stored redundantly such that it exists at more than one of the plurality of storage devices 350a, 350b, 350c, 350d, 350e that comprise cloud storage 350. Cloud storage administration module 310 is optionally configured to determine whether the new data record was successfully generated. See reference numeral 2210 in FIG. 2B. A number of factors may result in failure to generate the new data record, including an access conflict caused by a concurrent process or a hardware failure. If the new data record is not successfully generated, another attempt to store the new data record in cloud storage 350 can be made. Alternatively, the new data record generation process can be terminated in response to the write failure. In a modified embodiment, the new data record generation process is terminated only after a predetermined number of storage attempts have failed. If the new data record is successfully generated, journal administration module 320 is configured to update journal 340 to add a new journal record that includes the new counter index, the corresponding record timestamp, and one or more storage addresses corresponding to the cloud storage location or locations where the new data record was stored. See reference numeral 2220 in FIG. 2B. Once journal 340 has been updated, data storage method 2000 can be understood as having been completed. However, data storage method 2000 can be repeated in response to receipt of additional data to be stored in cloud storage 350.

As data storage method 2000 continues to operate in response to ongoing data acquisition, journal 340 maintained at cloud storage gateway 300 will continue to grow. In implementations where cloud storage gateway 300 manages data associated with multiple users, journal administration module 320 can be configured to maintain separate journals for separate users. At some point data replication method 3000 will be initiated to replicate a particular user's data from cloud storage 350 to local computing device 100 associated with that user. Data replication method 3000 can be initiated in response to a variety of predetermined criteria. For example, in one implementation data replication method 3000 is triggered when cloud storage gateway 300 detects that a threshold quantity of new data records have been identified in journal 340. In another implementation, data replication method 3000 is triggered when local computing device 100 detects that a data replication operation has not occurred within a specific threshold time period. In still other implementations, a combination of different conditions are used to determine when data replication method 3000 should commence. A wide range of other triggers can be used in other embodiments, and it will be appreciated that the various data replication methods disclosed herein can operate without regard to the details of the particular triggering event.

In one implementation, example data replication method 3000 commences with obtaining read state 172 from data synchronization module 170. For purposes of this disclosure, the obtained read state, which comprises a sequential counter index value, will be referred to herein as x. See reference numeral 3110 in FIG. 3A. Data synchronization module 170 is configured to request data synchronization from cloud storage gateway 300 beginning at the xth data record identified in journal 340, which also corresponds to the xth journal record. See reference numeral 3120 in FIG. 3A.

Upon receipt of the read state 172, cloud storage administration module 310 can be configured to determine whether a full synchronization condition exists. See reference numeral 3130 in FIG. 3A. Examples of full synchronization conditions include existence of a large quantity of data records that should be replicated, or a long time period since the last full synchronization was performed. In situations such as these, it is often more efficient to perform a full synchronization rather than to sequentially check the availability of individual data records, as will be described in turn. For example, in one implementation a full synchronization condition is considered to exist where the gap between read state 172 and the largest counter index stored in journal 340 exceeds 3000 indices. In another implementation, a full synchronization condition is considered to exist where the most recent full synchronization was performed more than twelve hours ago. One or more other full synchronization conditions can be implemented in other embodiments. Where a full synchronization condition is found to exist, cloud storage administration module 310 can be configured to perform the full synchronization. See reference numeral 3140 in FIG. 3A. In certain embodiments the full synchronization can be understood as comprising a process wherein a listing of all cloud storage data records are sent to local computing device 100. Local computing device can then determine which data records should be downloaded or uploaded. While a full synchronization generally consumes additional time and resources as compared to an incremental record-by-record data replication process, the burden this imposes on the user is mitigated by the fact that full synchronizations are performed relatively infrequently, for example in response to the aforementioned full synchronization conditions. Once the full synchronization is performed, the user's cloud-based data is replicated on local computing device 100, and therefore data replication method 3000 can be understood as having been completed.

If it is determined that a full synchronization condition does not exist, cloud storage administration module 310 can be configured to determine whether the xth journal record, which corresponds to read state 172, exists. See reference numeral 3210 in FIG. 3B. If the xth journal record exists, it can be queued for synchronization. See reference numeral 3220 in FIG. 3B. This can be accomplished by either copying the corresponding journal record to a memory cache hosted by cloud storage gateway 300, or alternatively, by queuing the network address itself. Read state x is then incremented. See reference numeral 3230 in FIG. 3B. It is then once again determined whether xth journal record exists.

As the read state x continues to increment, eventually a nonexistent journal record will be encountered. Where this is the case, cloud storage administration module 310 can be configured to determine whether any subsequent journal records exist. See reference numeral 3240 in FIG. 3B. Such a journal record would be associated with a counter index greater than or equal to (x+1). If such a journal record is available, this means that a gap exists at counter index x in the journal records. In this case, the data record corresponding to the (x+1)th journal record should not yet be queued for replication at local computing device 100 since doing so would cause intervening data records to be lost. Rather, cloud storage administration module 310 can be configured to evaluate a gap duration between the current time and the timestamp for the next available journal record. See reference numeral 3250 in FIG. 3B. This effectively measures the aging of the missing journal record or records. It can then be determined whether the evaluated gap duration exceeds a predetermined threshold. See reference numeral 3260 in FIG. 3B. If not, cloud storage administration module 310 can be configured to send the queued data records to the local computing device, as will be described in turn. However, if the evaluated gap duration does exceed the predetermined threshold, an inconsistency in journal 340 can be assumed, for example due to a server crash or a failed data write operation. In this case, a full synchronization is performed. In one implementation the predetermined threshold used to determine whether or not to perform a full synchronization is approximately five minutes.

If no subsequent journal record exists, it is possible that journal record x should be the last journal record indexed in journal 340, but does not exist due to a failed write operation or the like. This would make it impossible to detect any gap, as described above. Therefore, to determine whether this is the case, cloud storage administration module 310 is configured to obtain the last available counter index for the user associated with the data replication operation from log 220 maintained by counter generation module 200 ($ID_{log}$). See reference numeral 3310 in FIG. 3C. Cloud storage administration module 310 is also configured to obtain the counter index corresponding to the xth journal record maintained by cloud storage gateway 300 ($ID_{journal}$). See reference numeral 3320 in FIG. 3C. It can then be determined whether these two counter indices are equal, that is, whether $ID_{log} = ID_{journal}$. See reference numeral 3330 in FIG. 3C.

If the two counter indices are in fact equal, it can be assumed that the (x−1)th journal record was the last indexed journal record, and that no journal records are missing. In this case cloud storage communication module 330 can be configured to send a list of the queued journal records to local computing device 100. See reference numeral 3410 in FIG. 3D. Because the next data replication operation should commence at read state x, cloud storage communication module 330 is also configured to send the current read state x to local computing device 100. See reference numeral 3420 in FIG. 3D. Data synchronization module 170 is configured to retrieve data records identified list of queued journal records, and store the retrieved data records in local data repository 122. See reference numeral 3430 in FIG. 3D. In certain embodiments all of the queued data records are transmitted to local computing device 100 in one batch, while in alternative embodiments queued data records are transmitted to local computing device 100 in blocks based on a maximum page size. Data synchronization module 170 is also configured to store the received current read state x, thus enabling a subsequent data replication operation to commence at the correct journal record. See reference numeral 3440 in FIG. 3D. Once the replicated data records and the read state are saved by local computing device 100, data replication method 300 can be understood as having been completed.

If the two counter indices $ID_{log}$ and $ID_{journal}$ are not equal, it can be assumed that at least the xth journal record is missing. In this case cloud storage administration module 310 can be configured to evaluate a gap duration between the current time and the last available timestamp for the user associated with the data replication operation from log 220 maintained by counter generation module 200 ($TS_{log}$). See reference numeral 3340 in FIG. 3C. This effectively measures the aging of the missing journal record. It can then be determined whether the evaluated gap duration exceeds a predetermined threshold. See reference numeral 3350 in FIG. 3C. If not, cloud storage administration module 310 can be configured to send a list of the queued journal records to local computing device 100, as described previously. However, if the evaluated gap duration does exceed the predetermined threshold, an inconsistency in journal 340 can be assumed, for example due to a server crash or a failed data write operation. In this case, a full synchronization is performed. In one implementation the predetermined threshold used to determine whether or not to perform a full synchronization is approximately five minutes.

Conclusion

Numerous variations and configurations will be apparent in light of this disclosure. For instance one example embodiment provides a method for replicating data records stored in a cloud-based storage resource at a local computing device. The method comprises receiving a read state counter index from the local computing device. The method further comprises identifying, with reference to a journal, a plurality of journal records. Each of the journal records is associated with a counter index that forms a sequence starting with the read state counter index. Each of the journal records corresponds to a data record stored in the cloud-based storage resource. The method further comprises identifying an unavailable journal record that interrupts the sequence and that is associated with an unavailable counter index. The method further comprises transmitting a plurality of data records to the local computing device. The transmitted plurality of data records correspond to the identified plurality of journal records. The method further comprises transmitting the unavailable counter index to the local computing device. In some cases the unavailable counter index is associated with a data record that is not available to be retrieved from the cloud-based storage resource. In some cases the unavailable counter index is transmitted with instructions to replace the read state counter index with the unavailable counter index. In some cases the plurality of transmitted data records are transmitted to the local computing device in batches corresponding to a maximum page size. In some cases the method further comprises queueing the plurality of transmitted data records in a cache before transmitting them to the local computing device. In some cases identifying the plurality of journal records further comprises (a) identifying a subsequent journal record associated with a counter index that is greater than the unavailable counter index, such that a gap exists in the sequence; and (b) determining an age of the gap. In some cases identifying the plurality of journal records further comprises (a) identifying a subsequent journal record associated with a counter index that is greater than the unavailable counter index, such that a gap exists in the sequence; and (b) determining a difference between a timestamp associated with the subsequent journal record and a current time. In some cases the cloud-based storage resource comprises a plurality of geographically distributed storage devices. In some cases the method further comprises comparing the unavailable counter index with a last available counter index maintained by a counter generation module. In some cases the method further comprises (a) identifying a subsequent journal record associated with a counter index that is greater than the unavailable counter index, such that a gap exists in the sequence; and (b) invoking a full synchronization procedure in response to determining that the gap corresponds to a quantity of counter indices that exceeds a full synchronization threshold. In some cases the journal includes a record timestamp associated with each of the counter indices, the record timestamp corresponding to a time at which the associated counter index was generated.

Another example embodiment provides a data replication system that comprises a counter generation module. The counter generation module comprises a log entry that correlates a user, a counter index, and a creation timestamp. The system further comprises a cloud storage gateway. The cloud storage gateway comprises a plurality of cloud storage devices that form a cloud storage resource, and that collectively store a plurality of data records. The cloud storage gateway further comprises a journal that comprises a plurality of journal records. Each of the journal records correlates (a) a network address that identifies where a particular data record is stored in the cloud storage resource with (b) a particular counter index associated with a particular operation having been performed on the particular data record. The cloud storage gateway further comprises a cloud storage administration module configured to generate a list of journal records that corresponds to a plurality of operations recorded in the journal. The list comprises a continuous sequence of counter indices that terminates before the counter index included in the counter generation module log entry. In some cases the system further comprises a communication interface configured transmit the list of journal records to a client computing device. In some cases the log entry includes a token that identifies the user. In some cases the cloud storage gateway further comprises a journal administration module configured to request a new sequential counter index from the counter generation module in response to receipt of data that is to be stored in the cloud storage resource. In some cases the cloud storage administration module is further configured to identify a nonsequential journal record associated with a counter index that is greater than the counter index included in the counter generation module log entry. In some cases each of the journal records further correlates the network address with a particular creation timestamp corresponding to a time that the particular counter index was generated by the counter generation module.

Another example embodiment provides a computer program product that, when executed by one or more processors, causes a data storage process to be carried out. The process comprises receiving new data to be stored in a cloud-based storage resource. The process further comprises, in response to receiving the new data, generating a new journal record that comprises a new counter index and a timestamp. The new counter index is extracted from a user-specific log maintained by a counter generation module. The process further comprises saving an incremented counter index in the user-specific log. The process further comprises saving the new data in the cloud-based storage resource at a location identified by a network address. The new journal record correlates the new counter index with the network address. The new counter index is a sequential addition to an existing plurality of counter indices stored in a corresponding plurality of existing journal records that collectively represent a sequence of data modification operations performed on data stored in the cloud-based storage resource. In some cases the timestamp corresponds to a time at which the new data was saved in the cloud-based storage resource. In some cases (a) the new data is saved in the cloud-based storage resource at a plurality of locations identified by a corresponding plurality of network addresses; and (b) the new journal record correlates the new counter index with the plurality of network addresses. In some cases the new data is received by a cloud storage gateway that is in communication with the counter generation module.

The foregoing detailed description has been presented for the purposes of illustration and description. It is not intended to be exhaustive or to limit the invention to the particular disclosed embodiments. Many modifications and variations are possible in light of this disclosure. Thus it is intended that the scope of the invention be limited not by this detailed description, but rather by the claims appended hereto.

What is claimed is:

1. A method for replicating data records, the method comprising:
   receiving, by a cloud storage gateway, from a client computing device, a read state counter index that is associated with a particular user, wherein the cloud storage gateway includes an administration module that is configured to manage interactions with a plurality of cloud storage devices that collectively contain data records associated with the particular user;
   accessing a journal that is specific to the particular user, that the cloud storage gateway maintains, and that includes a plurality of journal records, each of which identifies one of the data records and a corresponding counter index;
   identifying, by the administration module, a subset of the journal records that collectively identify a corresponding subset of consecutive counter indices that form a sequence starting with the read state counter index;
   identifying, by the administration module, a counter index that is associated with an unavailable journal record, and that terminates, but is not included in, the sequence;
   transmitting, from at least one of the cloud storage devices to the client computing device, data records identified in the subset of journal records; and
   transmitting, from the administration module to the client computing device, the counter index that is associated with the unavailable journal record.

2. The method of claim 1, wherein the counter index that is associated with the unavailable journal record is transmitted with instructions to replace the read state counter index with the counter index that is associated with the unavailable journal record.

3. The method of claim 1, wherein the data records are transmitted to the client computing device in batches corresponding to a maximum page size.

4. The method of claim 1, further comprising queuing the data records identified in the subset of journal records in a cache before transmission to the client computing device.

5. The method of claim 1, wherein identifying the subset of journal records further comprises:
   identifying a subsequent counter index that is greater than the counter index that is associated with the unavailable journal record, wherein the subsequent counter index is associated with a subsequent available journal record;
   determining a difference between a timestamp associated with the subsequent available journal record and a current time; and
   determining whether the difference exceeds a threshold for invoking a full synchronization procedure for the data records associated with the particular user.

6. The method of claim 1, wherein identifying the subset of journal records further comprises:
   identifying a subsequent counter index that is greater than the counter index that is associated with the unavailable journal record, wherein the subsequent counter index is associated with a subsequent available journal record; and
   determining a difference between a timestamp associated with the subsequent available journal record and a current time.

7. The method of claim 1, wherein the plurality of cloud storage devices are geographically distributed.

8. The method of claim 1, further comprising comparing the counter index that is associated with the unavailable journal record with a last available counter index for the particular user, as maintained by a counter generation module.

9. The method of claim 1, further comprising:
   identifying a subsequent counter index that is greater than the counter index that is associated with the unavailable journal record, wherein the subsequent counter index is associated with a subsequent available journal record; and
   invoking a full synchronization procedure for the data records associated with the particular user in response to determining that a difference between (a) a timestamp associated with the subsequent available journal record and (b) a current time exceeds a full synchronization threshold.

10. The method of claim 1, wherein a particular journal record further identifies a record timestamp corresponding to a time at which a particular counter index identified in the particular journal record was generated.

11. A data replication system comprising:
   a counter generation module configured to administer a log that includes a log entry that correlates a particular user, a log counter index, and a creation timestamp; and
   a cloud storage gateway that comprises
      a communication module configured to receive, from a client computing device associated with the particular user, a read state counter index that is associated with the particular user,
      a plurality of cloud storage devices that form a cloud storage resource, and that collectively store data records associated with the particular user,
      a journal that is specific to the particular user and that comprises a plurality of journal records, each of which identifies a particular one of the data records, a network address that identifies where the particular data record is stored in the cloud storage resource, and a corresponding counter index that is associated with a particular operation having been performed on the particular data record, and
      a cloud storage administration module configured to identify:
         a subset of the journal records that collectively identify a corresponding subset of consecutive counter indices that form a sequence starting with the read state counter index and terminating before the log counter index, and a counter index that is associated with an unavailable journal record, and that terminates, but is not included in, the sequence, wherein the communication module is further configured to transmit, to the client computing device, (a) data records identified in the subset of journal records and (b) the counter index that is associated with the unavailable journal record.

12. The data replication system of claim 11, wherein the communication module is further configured to transmit a list of journal records in the subset to the client computing device.

13. The data replication system of claim 11, wherein the log entry includes a token that identifies the particular user.

14. The data replication system of claim 11, wherein the cloud storage gateway further comprises a journal administration module configured to request a new sequential counter index from the counter generation module in response to receipt of data that is to be stored in the cloud storage resource.

15. The data replication system of claim 11, wherein the counter index that is associated with the unavailable journal record is greater than the log counter index.

16. The data replication system of claim 11, wherein a particular journal record further identifies a record timestamp corresponding to a time that a particular counter index identified in the particular journal record was generated by the counter generation module.

17. A non-transitory computer readable medium having instructions encoded thereon that, when executed by one or more processors, cause a data storage process to be carried out, the data storage process comprising:

receiving, by a cloud storage gateway, from a client computing device, new data to be stored in a cloud-based storage resource that is administered by the cloud storage gateway, wherein the new data is attributable to a particular user of the client computing device, and wherein the cloud-based storage resource comprises a plurality of cloud storage devices;

sending, from the cloud storage gateway to a counter generation module, a request for a new counter index that is associated with the particular user;

receiving, at the cloud storage gateway, from the counter generation module, the new counter index;

generating a new journal record that comprises the received new counter index, a network address that identifies a location in the cloud-based storage resource where the new data is stored, and a timestamp; and saving the new data in the cloud-based storage resource at the location identified by the network address;

wherein the new counter index is a sequential addition to an existing plurality of counter indices stored in a corresponding plurality of existing journal records;

wherein the plurality of existing journal records collectively represent a sequence of data modification operations performed on data that is associated with the particular user and that is stored in the cloud-based storage resource; and wherein the new journal record and the existing journal records form part of a journal that is administered by the cloud storage gateway and that is associated with the particular user of the client computing device, such that the client computing device is configured to synchronize storage of the new data in the cloud-based storage resource without locally hosting the journal.

18. The non-transitory computer readable medium of claim 17, wherein the timestamp corresponds to a time at which the new data was saved in the cloud-based storage resource.

19. The non-transitory computer readable medium of claim 17, wherein:

the new data is saved in the cloud-based storage resource at a plurality of locations identified by a corresponding plurality of network addresses; and the new journal record correlates the new counter index with the plurality of network addresses.

20. The non-transitory computer readable medium of claim 17, wherein the data storage process further comprises saving an incremented counter index in a user-specific log maintained by the counter generation module.

* * * * *